April 2, 1968        A. E. DIEBOLD        3,376,571

RADAR SECTOR GATE APPARATUS

Filed Jan. 23, 1967        2 Sheets-Sheet 2

United States Patent Office 3,376,571
Patented Apr. 2, 1968

3,376,571
RADAR SECTOR GATE APPARATUS
Alfred E. Diebold, Huntington, N.Y., assignor to Hazeltine Research, Inc., a corporation of Illinois
Filed Jan. 23, 1967, Ser. No. 610,964
16 Claims. (Cl. 343—16)

ABSTRACT OF THE DISCLOSURE

Apparatus usable in radar systems for indicating a predetermined range of azimuths about a selected azimuth angle independently of the radar scanning rate. The apparatus has sine-cosine potentiometers for generating signals containing sinusoidal terms related to the selected azimuth angle and resistive networks corresponding to the desired range of azimuth angles for combining and mixing the generated signals to develop two sinusoidal terms, the time displacement between zero values of these terms indicating the desired range of azimuths.

BACKGROUND OF THE INVENTION

This invention relates to radar systems, and more particularly to sector gate apparatus for indicating when a selected azimuth angle or particular range of azimuths about a selected azimuth angle is being scanned by a radar system.

In radar systems which scan azimuth, for instance, often only a distinct azimuth, small range of azimuths, or plurality of small ranges is of interest at any one time.

Prior art conventional systems often use servo mechanisms to assist in performing this function. However, the azimuth angle scanned by the antenna may occasionally vary quite rapidly. Here, the servo system is unable to instantaneously track the rapid variation. To prevent the introduction of errors into the azimuth positional signal, complex error correcting circuitry is required.

In prior art frequency scan radar systems, the scanning of elevation, for example, is accomplished with signals having changing phases, rather than physical movement of the antenna. A particular advantage of such systems in shipboard operation is that the antenna no longer requires mounting on a stabilized platform. However, the rapid rolling and pitching of the ship will be translated to the antenna, having the same effect on azimuth as if the antenna were physically moved in relation to the ship—a rapid variation in the azimuth angle being scanned. These rapid variations may foreseeably occur quite frequently in such systems. Here, the use of servos to indicate the instantaneous azimuth is impractical since the standard error correcting circuitry contained in conventional systems is unable to compensate for such rapid variations, causing an erroneous indication of the azimuth being scanned.

Additiontlly, in frequency scan radar systems combined instantaneous scan azimuth and elevation signals are usually generated internally. These signals are relatively accurate, but, unfortunately, contain unwanted elevation components and are often also of rapidly varying amplitude.

SUMMARY OF THE INVENTION

Objects of the present invention are therefore to provide a new and useful apparatus which exhibits one or more of the following characteristics:

Increased accuracy in indicating when a radar system is scanning a particular selected azimuth angle or range of azimuth angles;

Relatively simple variation of the selected azimuth angle to be indicated;

Functions relatively independently of the scanning rate of the radar; and

Functions relatively independently of the elevation and changes therein.

Thus, in accordance with the invention, there is provided sector gate apparatus for use in indicating a predetermined range of azimuths ($2\gamma$) about a selected azimuth ($\alpha$) in a radar system. The apparatus includes first means for receiving sine $\theta$ and cosine $\theta$ signals representative of the instantaneous azimuth $\theta$ of a scanning radar beam. The apparatus also includes second means, coupled to the first means, for developing a first signal proportional to the product of the received sine $\theta$ signal and a term representative of the cosine $(\alpha+\beta)$. The second means is also for developing a second signal proportional to the product of the received sine $\theta$ signal and a term representative of the sine $(\alpha+\beta)$, a third signal proportional to the product of the received cosine $\theta$ signal and a term representative of the cosine $(\alpha+\beta)$, and a fourth signal proportional to the product of the received cosine $\theta$ signal and a term representative of minus the sine $(\alpha+\beta)$. Here, $\beta$ is a predetermined fixed reference angle which is greater than $\gamma$ by an angle $\phi$. The apparatus additionally includes third means, coupled to second means, for combining the second and the third signal to develop a fifth signal. The apparatus also include fourth means coupled to the second means for combining the first and the fourth signals to develop a sixth signal. The apparatus further includes fifth means coupled to the third and the fourth means for mixing the fifth and the sixth signals to develop a seventh and an eighth signal. The mixing parameters determine $\phi$ and thereby control the desired range of azimuths ($2\gamma$) about the selected azimuth. The seventh signal includes a first sinusoidal term representative of $(\theta-\alpha-\gamma)$ and the eighth signal includes a second sinusoidal term representative of $(\theta-\alpha+\gamma)$. The time displacement between zero values of the first and the second sinusoidal terms is representative of the desired range of azimuths.

BRIEF DESCRIPTION OF THE DRAWINGS

For a better understanding of the present invention together with other and further objects thereof, reference is had to the following description taken in conjunction with the accompanying drawings, and its scope will be pointed out in the appended claims.

Referring to the drawings.

DESCRIPTION OF THE INVENTION

Figure 1:
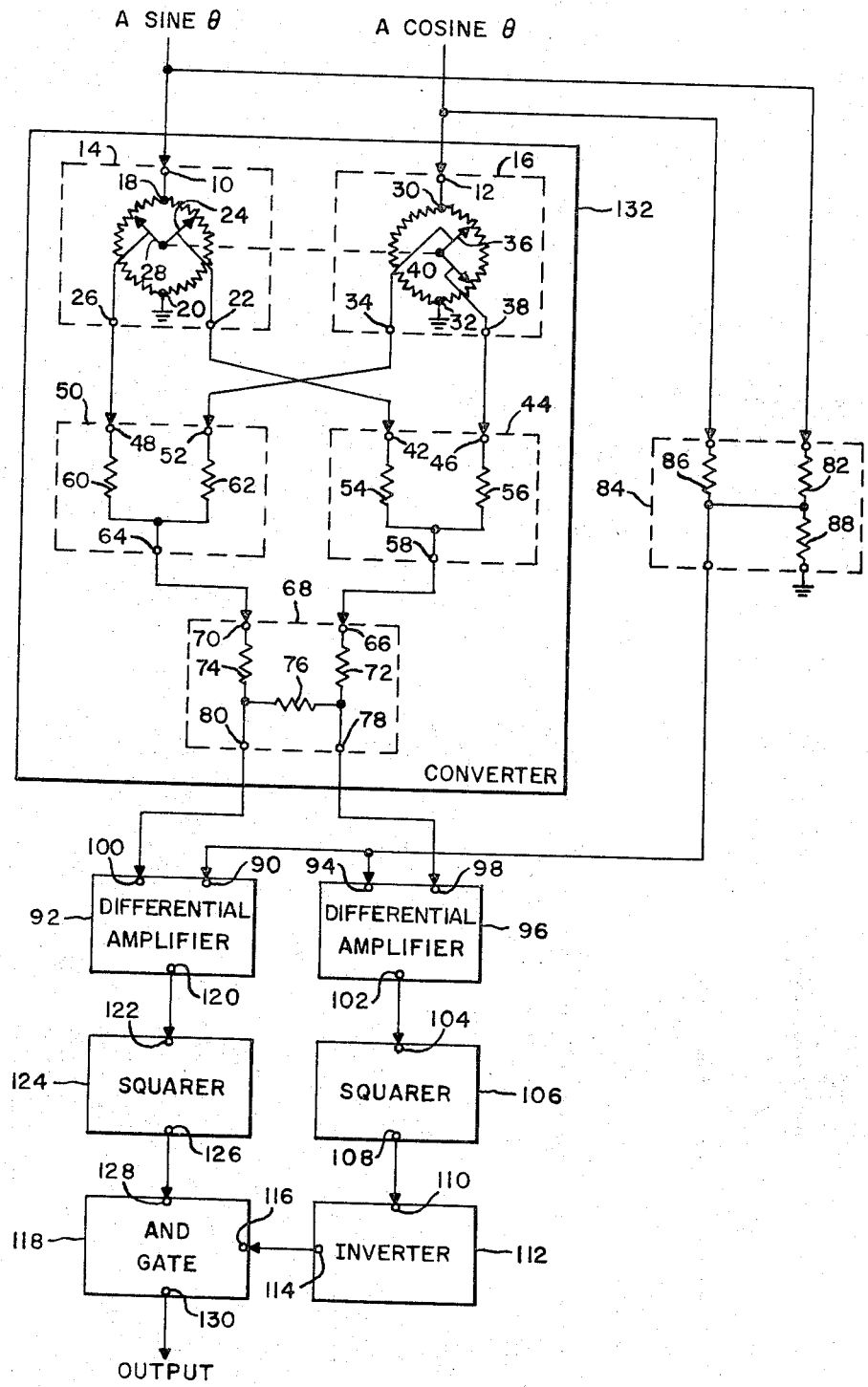
FIG. 1 is a diagram, partly schematic of one form of the invention where the apparatus receives inputs representative of the azimuth $\theta$ of a radar beam.

Description of the circuit of FIG. 1

Referring to FIG. 1, there is shown sector gate apparatus for use in indicating a predetermined range of azimuths ($2\gamma$) about a selected azimuth ($\alpha$), and constructed in accordance with one form of the invention. A means for receiving sine $\theta$ and cosine $\theta$ signals representative of the instantaneous azimuth $\theta$ of a scanning radar beam, is shown as a terminal 10 which receives the sine $\theta$ signal and a terminal 12 which receives a cosine $\theta$ signal, where $\theta$ represents the instantaneous azimuth of the beam. The terminal 10 is an input to a means for developing a first signal proportional to the product of the received sine $\theta$ signal and a term representative of the cosine $(\alpha+\beta)$, a second signal proportional to the product of the received sine $\theta$ signal and the term representative of the sine $(\alpha+\beta)$, a third signal proportional to the product of the received cosine $\theta$ signal and the signal representative of the cosine $(\alpha+\beta)$, and a fourth signal proportional to the product of the received cosine $\theta$ signal and a signal representative of minus and the sine $(\alpha+\beta)$, shown as a variable phase sinusoidal function generator illustrated as sine-cosine potentiometer 14 and sine-cosine potentiometer 16. For this purpose, $\beta$ is a predetermined reference angle which is greater than $\gamma$ by an angle $\phi$. Similarly, the terminal 12 is the input to the sine-cosine potentiometer 16. The potentiometer 14 and the potentiometer 16 may be ganged together as shown in FIG. 1 to permit simultaneous and equal adjustment of both potentiometers if desired.

The terminal 10 is connected to a zero degree tap 18 of the potentiometer 14. A one-hundred-eighty degree tap 20 of the potentiometer 14 is connected to a reference potential shown as ground. A first output terminal 22 of potentiometer 14 is connected to a first wiper arm 24 and a second output terminal 26 is connected to a second wiper arm 28 of the potentiometer 14. The first wiper arm 24 is positioned to provide a signal of a phase which leads the signal provided by the second wiper arm 28 by approximately ninety degrees, when the wiper arms are rotated in a clockwise direction as shown in FIG. 1.

The potentiometer 16 is similarly arranged with terminal 12 connected to a zero degree tap 30. A one-hundred-eighty degree tap 32 is connected to ground, a first output terminal 34 is connected to a first wiper 36, a second output terminal 38 is connected to a second wiper 40. The phase of the signal provided by the second wiper 40 leads the signal provided by the first wiper 36 by approximately ninety dergees.

The first output terminal 22 of potentiometer 14 is connected to a first input terminal 42 of a means for combining, shown as a first two-input adder 44. The second output terminal 38 of the potentiometer 16 is connected to a second input terminal 46 of the first added 44. The first input terminal 42 of the first added 44 is connected to one end of a first resistor 54. The second input terminal 46 of the first adder 44 is connected to one end of a second resistor 56, the other ends of the first resistor 54 and the second resistor 56 are connected together and also connected to an output terminal 58 of the first adder 44.

The second output terminal 26 of the potentiometer 14 is connected to a first input terminal 48 of a means for combining, shown as a second two-input adder 50. The first output terminal 34 of the potentiometer 16 is connected to a second input terminal 52 of the second adder 50.

The first input terminal 48 of the second adder 50 is connected to one end of a third resistor 60. The second input terminal 52 of the second adder 50 is connected to one end of a fourth resistor 62, the other ends of the third resistor 60 and the fourth resistor 62 are connected together and also connected to the output terminal 64 of the second adder 50. Resistors 54, 56, 60, and 62 each are of an impedance 2R.

The output termial 58 of the first adder 44 is connected to a first input terminal 66 of a mixing means 68. The output terminal 64 of the second adder 50 is connected to a second input terminal 70 of the mixing means 68. The first input terminal 66 of mixing means 68 is connected to one end of a fifth resistor 72. The second input terminal 70 of the mixing means 68 is connected to one end of a sixth resistor 74, the other ends of the resistor 72 and the resistor 74 are resistively connected together through a seventh resistor 76. The junction of the fifth resistor 72 and the seventh resistor 76 is connected to a first output terminal 78 of the mixer 68, and the junction of the sixth resistor 74 and the seventh resistor 76 is connected to a second output terminal 80 of the mixing means 68. The fifth resistor 72 and the sixth resistor 74 each are of an impedance R and the seventh resistor 76 is of an impedance $R_1$.

The terminal 10 is also connected to one end of an eighth resistor 82 of a means for translating, shown as translator 84 and the terminal 12 is similarly connected to one end of a ninth resistor 86 of translator 84. The other ends of the resistor 82 and the resistor 86 are connected to each other, connected through a tenth resistor 88 to a reference potential such as ground, and also connected to a subtrahend input 90 of a first means for subtracting undesired sinusoidal terms, shown as first differential amplifier 92 and a subtrahend input 94 of a second means for subtracting undesired sinusoidal terms shown as second differential amplifier 96. The eighth resistor 82 and the ninth resistor 86 each are of an impedance 2R and the tenth resistor 88 is of an impedance R.

The first output terminal 78 of the mixer 68 is connected to a minuend input 98 of the second differential amplifier 96 while the second output terminal 80 of the mixer 68 is connected to a minuend input 100 of the first differential amplifier 92. A difference terminal 102 of the second differential amplifier 96 is connected to an input 104 of a means for developing an output pulse which is shown to include a signal squaring means shown as a first squarer 106, having an output 108 which is connected to an input 110 of a signal polarity inverting means shown as a first inverter 112. An output 114 of the first inverter 112 is connected to a first input 116 of an AND gate 118. A difference terminal 120 of the first differential amplifier 92 is connected to an input 122 of the means for developing an output pulse, which is shown to further include a signal squaring means shown as a second squarer 124, having an output 126 which is connected to a second input 128 of the AND gate 118. The output pulse is developed at terminal 130, an output terminal of the AND gate 118.

OPERATION OF THE CIRCUIT OF FIG. 1

The terminal 10 receives a signal having a sine $\theta$ term such as A sine $\theta$, and the terminal 12 receives a signal having a cosine $\theta$ term such as B cosine $\theta$, where $\theta$ is the instantaneous azimuth being scanned by the radar beam of a radar system. The positions of potentiometer 14 and potentiometer 16 are determined by the selected azimuth of interest, $\alpha$ and a predetermined reference angle $\beta$ which is greater than $\gamma$ by an angle $\phi$. The potentiometer 14 develops output signals at terminals 22 and 26; the first output signal, at terminal 22, is equal to the product of the received sine $\theta$ signal and a term representative of the cosine $(\alpha+\beta)$, in particular the term $$\left[\frac{1\ \cos\ (\alpha+\beta)}{2}\right]$$

The second output signal, at terminal 26, is equal to the product of the received sine $\theta$ signal and a term representative of the sine $(\alpha+\beta)$, in particular the term $$\left[\frac{1+\ \sin\ (\alpha+\beta)}{2}\right]$$

Similarly, the potentiometer 16 develops output signals at the terminal 34 and the terminal 38. The first output signal, at the terminal 34 is equal to the product of the received cosine $\theta$ signal and $$\left[\frac{1+\ \cos\ (\alpha+\beta)}{2}\right]$$

the second, at terminal 38, equal to the product of the received cosine $\theta$ signal and $$\left[\frac{1-\sin\ (\alpha+\beta)}{2}\right]$$

These signals are developed by connecting the received sine $\theta$ signal to the terminal 10 and cosine $\theta$ signal to the terminal 12, which terminals correspond to zero degree points; and by rotating wipers 28, 24, 36 and 40 to angular positions corresponding to $(\alpha+\beta-90°)$, $(\alpha+\beta$, $(\alpha+\beta)$ and $(\alpha+\beta+90°)$, respectively. The degrees are measured in a clockwise direction from zero degree taps 18 and 30. In the embodiment herein described, A is equal to B and $\beta$ is equal to approximately 45 degrees. However, other values may be used.

The signal provided at first output terminal 34 of potentiometer 16 is added to the signal provided at the second output terminal 26 of potentiometer 14, and the additive sum, a fifth signal, is provided at output terminal 64 of second adder 50. Similarly, the signal provided at the first output terminal 22 is added to the signal provided at the second output terminal 38 and the additive sum, a sixth signal, is provided at output terminal 58 of first adder 44. The first adder 44 and the second adder 50 each have an internal impedance of R. (2R in parallel with 2R.)

The fifth signal developed by the adder 50 is:

$$\frac{A}{2}[\sin\,(\theta+\beta)+\cos\,(\theta-\alpha-\beta)]$$

and the sixth signal developed by the (first) adder 44 is:

$$\frac{A}{2}[\sin\,(\theta+\beta)+\sin\,(\theta-\alpha-\beta)]$$

The signals developed by the adders are mixed by the mixer 68 to provide a seventh signal, $E_7$, at terminal 78 and an eighth signal, $E_8$, at terminal 80. The seventh signal includes a first sinusoidal term representative of $(\theta-\alpha-\gamma)$ and the eighth signal includes a second sinusoidal term representative of $(\theta-\alpha+\gamma)$, the time displacement between zero values of the first and the second sinusodial terms being representative of the desired range of azimuth angles $2\gamma$ about the selected azimuth angle $\alpha$.

The mixing parameters of the mixer 68 are fixed by the impedances of the resistors 72, 74 and 76 thereby determining $\phi$ and controlling the desried range $2\gamma$. The seventh signal, developed at output terminal 78, is expressed by the equation:

$$E_7=\frac{A}{2}\left[\sin\,(\theta+\beta)+\left(\frac{R+R1}{2R+R1}\right)\sin\,(\theta-\alpha-\beta)+\left(\frac{R}{2R+R1}\right)\cos\,(\theta-\alpha-\beta)\right]$$

which expression simplifies to $$E_7=\frac{A}{2}\sin\,(\theta+\beta)+\frac{A\sqrt{(R+R_1)^2+R^2}}{2(2R+R1)}\sin\left[\theta-\alpha-\beta+\tan^{-1}\left(\frac{R+R1}{R}\right)\right]$$

The eighth signal, developed at the output terminal 78, is expressed by the equation:

$$E_8=\frac{A}{2}\left[\sin\,(\theta+\beta)+\left(\frac{R+R1}{2R+R1}\right)\cos\,(\theta-\alpha-\beta)+\left(\frac{R}{2R+R1}\right)\sin\,(\theta-\alpha-\beta)\right]$$

which expression simplifies to $$E_8=\frac{A}{2}(\theta+\beta)+\frac{A\sqrt{(R+R1)^2+R^2}}{2(2R+R1)}\sin\left[\theta-\alpha+\beta-\tan^{-1}\left(\frac{R+R1}{R}\right)\right]$$

By defining the desired range of azimuth angles, $2\gamma$, about the selected azimuth angle $\alpha$, as: $\gamma=\beta-\phi$, where $$\phi=\tan^{-1}\left(\frac{R+R1}{R}\right)$$

we see that the signal $E_7$ contains a first sinusoidal term representative of $(\theta-\alpha-\gamma)$ and the signal $E_8$ contains a second sinusoidal term representative of $(\theta-\alpha+\gamma)$. By a suitable selection of R and $R^1$ in the adder 44, the adder 50, and the mixer 68, $\gamma$ is determined. If it is desired to vary $\gamma$, it is merely required to vary the combination of R and R1.

The sinusoidal term of interest in the signal $E_8$ will have a magnitude of zero when $\theta$ is equal to $(\alpha-\gamma)$, and the representative term in the signal $E_7$ will have a magnitude of zero when $\theta$ is equal to $(\alpha+\gamma)$. The time displacement between zero values of these two terms represents the range of azimuth angles of interest ($2\gamma$) about the selected azimuth angle $\alpha$, the range being spaced $\pm\gamma$ degrees about. If an indication of only the azimuth angle $\alpha$ is desired, the angle $\gamma$ should be made very small. The range of azimuth angles then approaches the selected azimuth angle itself.

The signals $E_7$ and $E_8$ are developed from the received signals without use of a servo system and therefore are substantially independent of rapid variations in the instantaneous azimuth angle of the radar beam. The range of interest is determined merely by selecting proper impedance values for R and $R_1$, and does not appreciably vary with changes in $\theta$, the selected azimuth angle. Additionally, the quantity A in the received signals may actually be an amplitude varying term such as B cosine $\epsilon$, where $\epsilon$ denotes the elevation angle. Such is often the case in frequency scan systems. Where these systems are used aboard a ship, for example, the elevation angle might conceivably vary from zero degrees to fifty degrees and may do so quite rapidly. However, the time displacement is measured between zero values of the representative sinusoidal terms and since cosine $\epsilon$ is zero only when $\epsilon$ is ninety degrees, even rapid variations in the elevation angle do not substantially affect proper operation of the apparatus, since such variations do not affect the terms' zero magnitudes.

Figure 2:
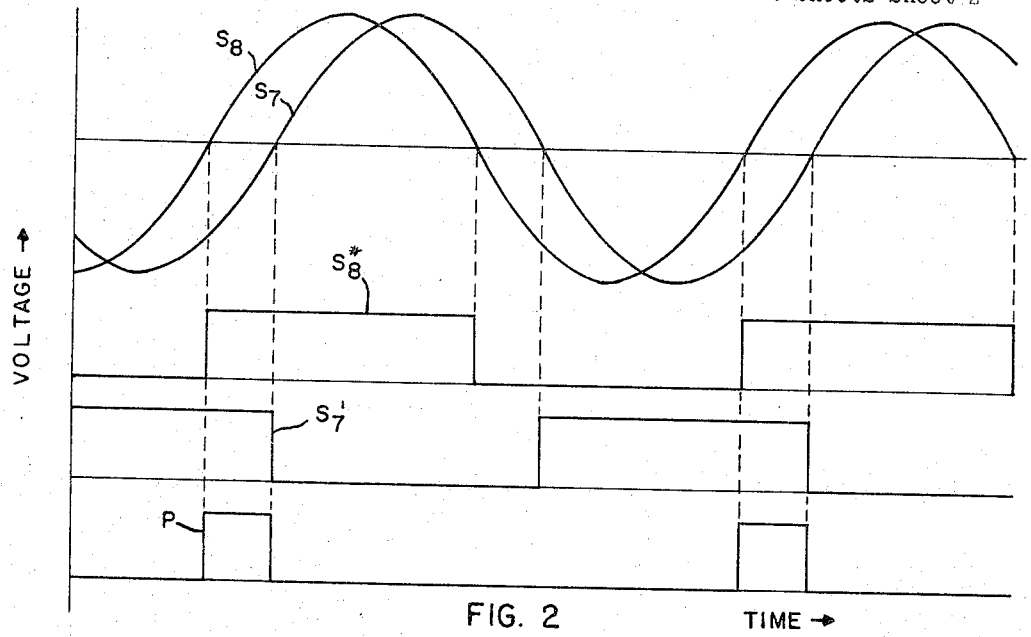
FIG. 2 depicts typical waveforms generated by the apparatus of FIGS. 1 and 3.

Both the signal $E_7$ and the signal $E_8$ contain an unwanted sine $(\theta+\beta)$ term, which are denoted as undesired sinusoidal terms. The received A sine $\theta$ and A cosine $\theta$ signals are combined in the translating means 84 to develop a signal equal to these undesired sinusoidal terms. The signal has impedance equal to the internal impedance, 2R, of the translator 84. This translated signal is subtracted from $E_8$ by the first differential amplifier 92 which functions as a difference detector to develop a signal $S_8$ at the difference terminal 120 and is subtracted from $E_7$ by the second differential amplifier 96 which functions as a difference detector to develop a signal $S_7$ at the difference terminal 102. When A is of constant amplitude, $S_7$ and $S_8$ are sinusoidal signals as shown in FIG. 2. These signals correspond to the first sinusoidal term and the second sinusoidal term, respectively. Both signals are coupled to the means for developing an output pulse, which includes a means for squaring, shown as first squarer 106 and second squarer 124. Signal $S_7$ is squared by the first squarer 106 and inverted by an inverting means shown as inverter 112 to become $S_7'$, as shown in FIG. 2. The signal $S_8$ is squared by second squarer 124 to become $S_8*$ as shown in FIG. 2, and ANDED with $S_7'$ in AND circuit 118. The output of the AND circuit 118 is a positive pulse, P, at output terminal 130, as also shown in FIG. 2. The pulse commences when $S_8*$ has zero magnitude and begins to become positive, and terminates when $S_7$ has zero magnitude and begins to become positive. The width of the pulse is $2\gamma$, centered at $\alpha$, and represents the range of azimuth angles of interest, $2\gamma$, about the selected azimuth angle $\alpha$. This pulse is suitable for providing an indication of when the radar beam is scanning the range of azimuth angles of interest.

DESCRIPTION OF THE CIRCUIT OF FIG. 3

Figure 3:
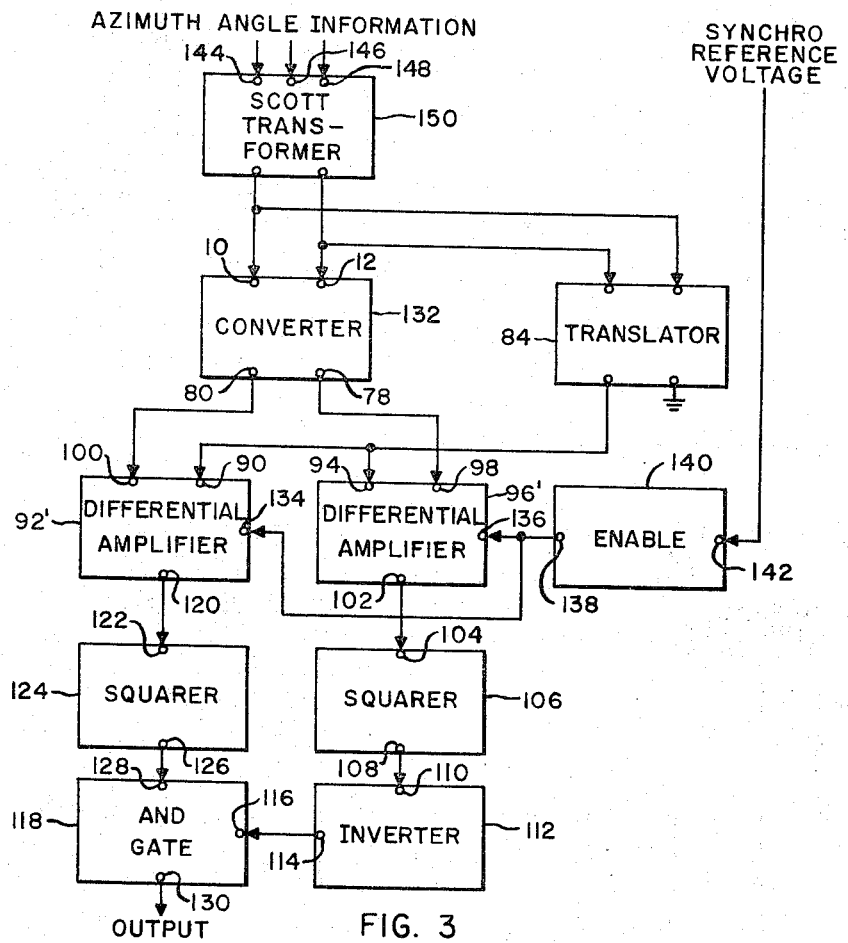
FIG. 3 is a block diagram of a modification of the apparatus shown in FIG. 1.

Referring to FIG. 3, there is shown apparatus for use in indicating a selected azimuth angle or range of azimuths about that angle, constructed in accordance with one form of the invention. The apparatus shown in FIG. 3 is similar to that of FIG. 1, except that the elements of FIG. 3 are adapted for use with a three-wire synchro system input.

FIG. 3 depicts a converter 132 which includes the sine-cosine potentiometer 14, sine-cosine potentiometer 16, the first adder 44, the second adder 50, and the mixer 68, as shown in FIG. 1. The apparatus of FIG. 3 also includes a first differential amplifier 92', a second differential amplifier 96', the first squarer 106, the second squarer 124, the inverter 112 and the AND circuit 118, as shown in FIG. 1. The first differential amplifier 92' shown herein is the same as first differential amplifier 92 but additionally includes an enable input terminal 134, and the second differential amplifier 96', shown herein, includes an enable input terminal 136 connected to the first enable input terminal 134 and connected to an output terminal 138 of an enable means 140. An input terminal 142, supplies the enable circuit 140 with a synchro reference voltage from the servo system (not shown). A conventional three-wire input representing the instantaneous azimuth angle being scanned by a synchro which tracks the radar antenna of a radar system is connected to a terminal 144, a terminal 146 and a terminal 148, respectively, of a Scott transformer 150.

OPERATION OF THE CIRCUIT OF FIG. 3

The input terminals 144, 146 and 148 of the Scott transformer 150 receive a three-wire position signal from a synchro. The received signal represents the instantaneous angular position of a radar antenna and thus corresponds to the instantaneous azimuth angle $\theta$ being scanned by the radar beam.

The input terminal 144 receives a signal of the form A sine $\theta$ sine $\omega t$, the input terminal 146 receives a signal of the form A sine $(\theta+120°)$ sine $\omega t$, and the input terminal 148 receives a signal of the form A sine $(\theta-120°)$ sine $\omega t$. The Scott transformer transforms these three signals into two signals. The signal provided at terminal 10 is of the form A sine $\theta$ sine $\omega t$ and the signal provided at terminal 12 is of the form A cosine $\theta$ sine $\omega t$. These two signals are similar to the signals described in the operation of the circuit of FIG. 1 except for an additional sine $\omega t$ term. This term reflects a synchro reference voltage where $\omega=2\pi f$ and $f$ may be, for example, 60 cycles per second, in which case the magnitude of this sine $\omega t$ term will be zero one-hundred-twenty times per second. This unwanted sine $\omega t$ term must be nullified since proper system operation depends on zero values to provide an indication of the range of azimuths of interest. Therefore, the synchro reference voltage, which also contains a sine $\omega t$ term, is connected to the enable circuit 140. The enable circuit 140 enables the differential amplifiers only when the sine $\omega t$ term is not of zero magnitude. This prevents erroneous indications of the desired range of azimuths attributable to the zero magnitudes of the sine $\omega t$ term. The circuit of FIG. 3 otherwise operates in the same manner as the circuit described in FIG. 1.

While applicant does not wish to be limited to any particular set of circuit constants, the following have proved useful in converter 132.

| | Ohms |
|---|---|
| Resistor 54 | 200,000 |
| Resistor 56 | 200,000 |
| Resistor 60 | 200,000 |
| Resistor 62 | 200,000 |
| Resistor 72 | 100,000 |
| Resistor 74 | 100,000 |
| Resistor 76 | 50,000 |
| Resistor 82 | 200,000 |
| Resistor 86 | 200,000 |
| Resistor 88 | 100,000 |
| Sine-cosine potentiometer 14: total resistance from zero degree tap 18 to one-hundred-eighty degree tap 20 | 10,000 |
| Sine-cosine potentiometer 16: total resistance from zero degree tap 30 to one-hundred-eighty degree tap 32 | 10,000 |

While there has been what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

I claim:
1. Sector gate apparatus for use in indicating a predetermined range of azimuths ($2\gamma$) about a selected azimuth ($\alpha$) in a radar system comprising:

first means for receiving sine $\theta$ and cosine $\theta$ signals representative of the instantaneous azimuth $\theta$ of a scanning radar beam;

second means coupled to the first means for developing a first signal proportional to the product of the received sine $\theta$ signal and a term representative of the cosine $(\alpha+\beta)$, a second signal proportional to the product of the received sine $\theta$ signal and a term representative of the sine $(\alpha+\beta)$, a third signal proportional to the product of the received cosine $\theta$ signal and a term representative of the cosine $(\alpha+\beta)$, and a fourth signal proportional to the product of the received cosine $\theta$ signal and a term representative of minus the sine $(\alpha+\beta)$, $\beta$ being a predetermined fixed reference angle which is greater than $\gamma$ by an angle $\phi$;

third means coupled to the second means for combining the second and the third signal to develop a fifth signal;

fourth means coupled to the second means for combining the first and the fourth signals to develop a sixth signal;

and fifth means coupled to the third and the fourth means for mixing the fifth and the sixth signals to develop a seventh and an eighth signal, the mixing parameters determining $\phi$ and thereby controlling the desired range of azimuths ($2\gamma$) about the selected azimuth, the seventh signal including a first sinusoidal term representative of $(\theta-\alpha-\gamma)$ and said eighth signal including a second sinusoidal term representative of $(\theta-\alpha+\gamma)$, the time displacement between zero values of the first and the second sinusoidal terms being representative of the desired range of azimuths.

2. Sector gate apparatus as described in claim 1, constructed for operation with a predetermined reference angle $\beta$ having a magnitude fixed at approximately 45°.

3. Sector gate apparatus as described in claim 1, wherein the second means includes first and second sine-cosine potentiometers, each potentiometer having first and second wiper arms and a zero and a one-hundred-eighty degree tap, the received sine $\theta$ signal is supplied to the zero degree tap of the first potentiometer and the received cosine $\theta$ signal is supplied to the zero degree tap of the second potentiometer, the one-hundred-eighty degree taps of the first and the second potentiometers are coupled to a source of reference potential, the first and the second signals are provided at the first and second wiper arms respectively of the first potentiometer and the third and fourth signals are provided at the first and second wiper arms respectively of the second potentiometer.

4. Sector gate apparatus as described in claim 3, wherein the first and second potentiometers are ganged together, the output signal at the first wiper arm of the first potentiometer is the product of the received sine $\theta$ signal and $$\left[\frac{1+\cos(\alpha+\beta)}{2}\right]$$

the output signal at the second wiper arm of the first potentiometer is the product of the received sine $\theta$ signal and $$\left[\frac{1+\sin(\alpha+\beta)}{2}\right]$$

the output signal at the first wiper arm of the second potentiometer is the product of the received cosine $\theta$ signal and $$\left[\frac{1+\cos(\alpha+\beta)}{2}\right]$$

and the output signal at the second wiper arm of the second potentiometer is the product of the received cosine $\theta$ signal and $$\left[\frac{1-\sin(\alpha+\beta)}{2}\right]$$

5. Sector gate apparatus as described in claim 4, constructed for operation with a predetermined reference angle $\beta$ having a magnitude fixed at approximately 45°.

6. Sector gate apparatus as described in claim 1, wherein:

the third means includes a two-input added comprising a first resistance and a second resistance, the second signal is coupled to one end of the first resistance, the third signal is coupled to one end of the second resistance, and the remaining end of the first and second resistances are coupled together to develop a fifth signal which is the additive sum of the second and the third signals;

the fourth means includes a two-input adder comprising a third resistance and a fourth resistance, the first signal is coupled to one end of the third resistance and the fourth signal is coupled to one end of the fourth resistance, and the remaining ends of the third and fourth resistances are coupled to develop a sixth signal which is substantially the additive sum of the first and fourth signals.

7. Sector gate apparatus as described in claim 1, wherein the fifth means includes a fifth resistance, a sixth resistance and a seventh resistance, the fifth signal is coupled to one end of the fifth resistance, the sixth is coupled to one end of the sixth resitsance and the other ends of the fifth and sixth resistances are coupled to opposite ends of the seventh resistance, to develop the seventh signal at the junction of the sixth resistance and the seventh resistance, and the eighth signal at the junction of the fifth resistance and the seventh resistance.

8. Sector gate apparatus as described in claim 1, constructed for operation with received sine $\theta$ and cosine $\theta$ signals containing additional components representative of an instantaneous elevation angle $\epsilon$, of the scanning radar beam, wherein the means for mixing develops seventh and eigth signals having first and second sinusoidal terms respectively whose zero values are substantially unaffected by said elevation components.

9. Sector gate apparatus as described in claim 1, which additionally comprises sixth means coupled to the first means for translating the received sine $\theta$ and cosine $\theta$ signals to develop a signal substantially equal to an undesired sinusoidal term in the seventh signal and a signal substantially equal to an undesired sinusoidal term in the eighth signal.

10. Sector gate apparatus as described in claim 9, wherein the undesired sinusoidal term in the seventh signal is substantially equal to the undesired sinusoidal term in the eighth signal and the sixth means develops only one output signal substantially equal to said undesired term.

11. Sector gate apparatus as described in claim 9, which additionally includes a seventh means coupled to the sixth means and the fifth means for subtracting an undesired sinusoidal term from the seventh signal, leaving substantially only the first sinusoidal term and eighth means coupled to the fifth means and the sixth means for subtracting an undesired sinusoidal term from the eighth signal leaving substantially only the second sinusoidal term.

12. Sector gate apparatus as described in claim 11, which additionally comprises a means coupled to the seventh means for developing an output pulse, said pulse commencing when the first sinusoidal term representative of $(\theta-\alpha-\gamma)$ is substantially of zero magnitude and terminating when the second sinusoidal term representative of $(\theta-\alpha+\gamma)$ is substantially of zero magnitude, wherein the width of the pulse represents the range of azimuth angles of interest, $2\gamma$, the center of the pulse representing the selected azimuth angle $\alpha$.

13. Sector gate apparatus as described in claim 11, which additionally includes ninth means coupled to the seventh means for squaring said remaining first sinusoidal term and tenth means coupled to the eighth means for squaring said remaining second sinusoidal term, an inverter coupled to the ninth means for inverting the squared first sinusoidal term, an AND circuit coupled to the inverter and to the tenth means for developing a pulse output, wherein the width of the pulse is proportional to and represents the range of azimuth angles of interest, $2\gamma$, about the selected azimuth angle $\alpha$.

14. Sector gate apparatus as described in claim 11, which additionally comprises a transformer for transforming received three-wire positional information representative of the instantaneous azimuth $\theta$ of a scanning radar beam into sine $\theta$ sine $\omega t$ and cosine $\theta$ sine $\omega t$ signals and for supplying said signals to said first means; a gating means coupled to the seventh and the eighth means for disabling the seventh and eighth means when the magnitude of said sine $\omega t$ term is zero.

15. Sector gate apparatus for use in indicating a predetermined range of azimuths ($2\gamma$) about a selected azimuth ($\alpha$) in a radar system comprising:

first means for receiving sine $\theta$ and cosine $\theta$ signals representative of the instantaneous azimuth $\theta$ of a scanning radar beam;

a first potentiometer coupled to the first means, including a zero degree tap which is supplied with the received sine $\theta$ signal, a one-hundred-eighty degree tap coupled to ground, a first wiper arm which provides a first signal substantially equal to the product of the received sine $\theta$ signal and $$\left[\frac{1+\cos(\alpha+45°)}{2}\right]$$

and the second wiper arm which provides a second signal substantially equal to the product of the received sine $\theta$ signal and $$\left[\frac{1+\sin(\alpha+45°)}{2}\right]$$

a second potentiometer ganged to the first potentiometer and coupled to the first means, including a zero degree tap which is supplied with the received cosine $\theta$ signal, a one-hundred-eighty degree tap coupled to ground, a first wiper arm which provides a third signal substantially equal to the product of the received cosine $\theta$ signal and $$\left[\frac{1+\cos(\alpha+45°)}{2}\right]$$

and a second wiper arm which provides a fourth signal substantially equal to the product of the received cosine $\theta$ signal and $$\left[\frac{1-\sin(\alpha+45°)}{2}\right]$$

a first two input adder coupled to the first and second potentiometers, comprising a third resistance and a fourth resistance, the first signal is coupled to one end of the third resistance and the fourth signal is coupled to one end of the fourth resistance, and the remaining ends of the third and fourth resistances are coupled together to develop a signal which is substantially the additive sum of the first and fourth signals;

a second two input adder coupled to the first and second potentiometers, comprising a first resistance and a second resistance, the second signal is coupled to one end of the first resistance, the third signal is coupled to one end of the second resistance, and the remaining ends of the first and second resistances are coupled together to develop a fifth signal which is substantially the additive sum of the second and third signals;

a means for mixing coupled to the first and second adders and including a fifth resistance, a sixth resistance and a seventh resistance, the fifth signal is coupled to one end of the fitfh resistance, the sixth signal is coupled to one end of the sixth resistance, and the other ends of the fifth and sixth resistances are coupled to opposite ends of the seventh resistance to develop a seventh signal at the junction of the sixth resistance and the seventh resistance and an eighth signal at the junction of the fifth resistance and the seventh resistance, the impedances of the first through the seventh resistance determining $\phi$ and thereby controlling the desired range of azimuths ($2\gamma$) about the selected azimuth, the seventh signal including a first sinusoidal term representative of ($\theta-\alpha-\gamma$) and the eighth signal including a second sinusoidal term representative of ($\theta-\alpha+\gamma$), the time displacement between zero values of the first and second sinusoidal terms being representative of the desired range of azimuths.

16. Sector gate apparatus as described in claim 15, wherein the impedance of each of the first, second, third fourth resistances is substantially 2R, the impedance of each of the fifth and sixth resistances is substantially R, impedance of the seventh resistance is substantially $R_1$, the angle $\beta$ is substantially equal to 45°, the angle $\phi$ is substantially equal to $$\tan^{-1}\left(\frac{R+R_1}{R}\right)$$

and the angle $\gamma$ is substantially equal to $$45° - \tan^{-1}\left(\frac{R+R^1}{R}\right)$$

No references cited.

RODNEY D. BENNETT, *Primary Examiner.*

C. L. WHITHAM, *Assistant Examiner.*